United States Patent
Takikawa

(10) Patent No.: US 7,422,396 B2
(45) Date of Patent: Sep. 9, 2008

(54) DRILL HAVING CONSTRUCTION SUITABLE FOR ENLARGING PREVIOUSLY FORMED HOLE

(75) Inventor: Yoshihiro Takikawa, Shinshiro (JP)

(73) Assignee: OSG Corporation, Aichi (JP)

( * ) Notice: Subject to any disclaimer, the term of this patent is extended or adjusted under 35 U.S.C. 154(b) by 275 days.

(21) Appl. No.: 11/051,085

(22) Filed: Feb. 4, 2005

(65) Prior Publication Data

US 2006/0037786 A1    Feb. 23, 2006

(30) Foreign Application Priority Data

Aug. 19, 2004  (JP) ............................. 2004-240064

(51) Int. Cl.
B23B 51/02     (2006.01)
B23B 51/06     (2006.01)

(52) U.S. Cl. ........................... 408/59; 408/1 R; 408/230

(58) Field of Classification Search ................. 408/227, 408/230, 59, 229, 56, 57, 1 R; B23B 51/00, B23B 51/02, 51/06
See application file for complete search history.

(56) References Cited

U.S. PATENT DOCUMENTS

| 1,309,706 | A | * | 7/1919 | Taylor | 408/230 |
| 2,334,089 | A | * | 11/1943 | Hallden | 408/211 |
| 2,348,874 | A | * | 5/1944 | Andreasson | 408/57 |
| 2,370,706 | A | * | 3/1945 | Andreasson | 408/230 |
| 3,237,488 | A | * | 3/1966 | Parone et al. | 408/230 |
| 3,443,459 | A | * | 5/1969 | Mackey, Jr. et al. | 408/230 |
| 3,598,500 | A | * | 8/1971 | Oxford, Jr. | 408/210 |
| 3,977,807 | A | * | 8/1976 | Siddall | 408/223 |
| 4,137,002 | A | * | 1/1979 | Barker et al. | 408/59 |
| 4,143,723 | A | * | 3/1979 | Schmotzer | 175/420.1 |
| 4,744,705 | A | * | 5/1988 | Imanaga | 408/230 |
| 4,826,364 | A | * | 5/1989 | Grunsky | 408/59 |
| 5,137,398 | A | * | 8/1992 | Omori et al. | 408/145 |
| 5,380,133 | A | * | 1/1995 | Schimmer | 408/199 |
| 5,486,075 | A | * | 1/1996 | Nakamura et al. | 408/230 |
| 5,725,338 | A | * | 3/1998 | Cabaret et al. | 408/230 |
| 6,082,935 | A | * | 7/2000 | Hori | 407/54 |
| 6,132,149 | A | * | 10/2000 | Howarth et al. | 408/230 |
| 6,419,561 | B1 | * | 7/2002 | George | 451/48 |
| 6,676,342 | B2 | * | 1/2004 | Mast et al. | 408/144 |
| 6,916,139 | B2 | * | 7/2005 | Yanagida et al. | 408/230 |

(Continued)

FOREIGN PATENT DOCUMENTS

DE           1752261 A       2/1968

(Continued)

*Primary Examiner*—Daniel W Howell
(74) *Attorney, Agent, or Firm*—Muramatsu & Associates

(57) ABSTRACT

A drill which includes a cylindrical main body and a shank contiguous to each other, and which is to be rotated about an axis of the cylindrical main body in a predetermined rotating direction, for enlarging a hole previously formed in a workpiece through a die-casting process. The cylindrical main body has flutes which are formed in the cylindrical mainbody and extend from an axially distal end portion of the cylindrical main body toward the shank, so as to provide cutting edges in the axially distal end portion of the cylindrical main body. The cutting edges cooperate with each other to define a point angle which is larger than 170° and is smaller than 180°. Each of the cutting edges is substantially straight or is curved to be convexed as seen in the direction perpendicular to the axis.

18 Claims, 5 Drawing Sheets

U.S. PATENT DOCUMENTS

| | | |
|---|---|---|
| 6,923,602 B2 * | 8/2005 | Osawa et al. ................ 408/230 |
| 2004/0151553 A1 * | 8/2004 | George et al. ............... 408/230 |
| 2006/0099042 A1 * | 5/2006 | Nakashima et al. ......... 408/230 |

FOREIGN PATENT DOCUMENTS

| | | | | |
|---|---|---|---|---|
| JP | 63260710 A | * | 10/1988 | |
| JP | 02109620 A | * | 4/1990 | |
| JP | 07-40117 | | 2/1995 | |
| JP | 2002052140 A | * | 2/2002 | |
| JP | 2002126927 A | * | 5/2002 | |
| JP | 2002-370113 | | 12/2002 | |
| JP | 2004-141970 | | 5/2004 | |

* cited by examiner

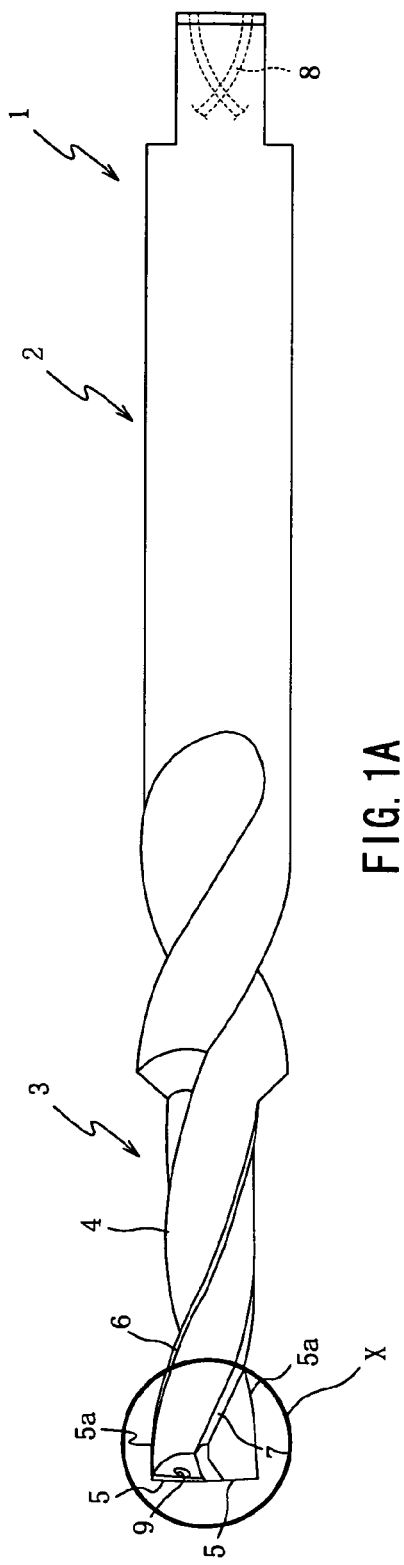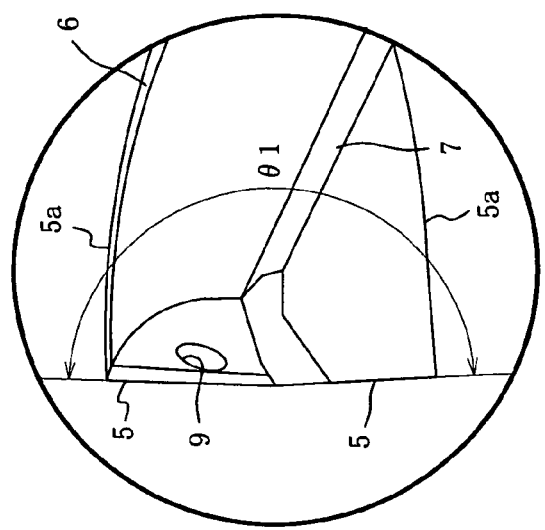
FIG. 1A
FIG. 1B

FIG. 4A

| USED DRILL | CUTTING SPEED | | DEVIATION AMOUNT | GENERATED NOISE |
|---|---|---|---|---|
| | NUMBER OF REVOLUTIONS | FEED RATE | | |
| CONVENTIONAL DRILL | 12,000 min$^{-1}$ | 1.3 mm/rev | 0.504 mm | LARGE |
| | 6,000 min$^{-1}$ | 0.33 mm/rev | 0.234 mm | LARGE |
| DRILL OF INVENTION | 12,000 min$^{-1}$ | 1.3 mm/rev | 0.040 mm | SMALL |
| | 6,000 min$^{-1}$ | 0.33 mm/rev | 0.060 mm | SMALL |

FIG. 4B

| USED DRILL | CUTTING SPEED | | NUMBER OF ENLARGED HOLES | DEVIATION AMOUNT |
|---|---|---|---|---|
| | NUMBER OF REVOLUTIONS | FEED RATE | | |
| CONVENTIONAL DRILL | 12,000 min$^{-1}$ | 1.3 mm/rev | 1ST HOLE | 0.501 mm |
| | | | 2ND HOLE | 0.448 mm |
| | | | ⋮ | ⋮ |
| | | | 16TH HOLE | DRILL BREAKAGE |
| DRILL OF INVENTION | 12,000 min$^{-1}$ | 1.3 mm/rev | 1ST HOLE | 0.060 mm |
| | | | 2ND HOLE | 0.060 mm |
| | | | ⋮ | ⋮ |
| | | | 199TH HOLE | 0.070 mm |
| | | | 200TH HOLE | 0.060 mm |

DRILL HAVING CONSTRUCTION SUITABLE FOR ENLARGING PREVIOUSLY FORMED HOLE

BACKGROUND OF THE INVENTION

1. Field of the Invention

The present invention relates in general to a drill, and more particularly to such a drill that is to be used to enlarge a hole previously formed in a workpiece, for example, in a die-casting process.

2. Discussion of the Related Art

In general, most of commercially available drills have a point angle of 120-140°. However, such a drill having the point angle of 120-140° has a difficulty in an operation for drilling a hole in a work surface which is not perpendicular to an axis of the drill, or which is curved or otherwise shaped to be brought into contact with a radial corner of the drill earlier than with a point of the drill, upon biting of the drill onto the work surface. This is because the drill is in contact at only one of its diametrically opposite portions with the work surface in an initial stage of the drilling operation, thereby increasing a radial component of a cutting resistance or force, where this radial component forces the point of the drill outwardly in the radial direction. Due to the increased radial component of the cutting force, the point of the drill is deviated from a target position, thereby resulting in a low positional accuracy of the drilled hole.

In the interest of avoiding such a reduction in the positional accuracy of the drilled hole, there is proposed a drill as disclosed in JP-A-2004-141970 (publication of unexamined Japanese Patent Application laid open in 2004), which is given a point angle as large as 170-180°. Such a relatively large point angle is somewhat effective to reduce the radial component of the cutting force acting on the drill in an initial stage of the drilling operation, thereby restraining the deviation of the point of the drill from the target position.

In the drill disclosed in JP-A-2004-141970, each of cutting edges (provided in an axially distal end portion of its cylindrical main body) has a curved portion which is curved to be concaved rearwardly as viewed in a rotating direction of the drill, so that chips produced as a result of cutting of a workpiece are compressed in a radial direction of the drill, whereby the chips can be easily broken. Owing to the easy breakage of the chips, it is possible to prevent the chips from being packed between the drill and the workpiece and also prevent the chips from being rolled around the drill. However, when this drill is used to enlarge a hole previously formed in a workpiece, for example, in a die-casting process, the drill is likely to be forced outwardly in the radial direction by the radial component of the cutting force. That is, in this instance, the curved portion of each cutting edge brought into contact with the workpiece causes the radial component of the cutting force to act on the drill outwardly in the radial direction rather than inwardly in the radial direction, thereby deviating the point of the drill from a target position and accordingly resulting in low positional accuracy of the machined hole.

SUMMARY OF THE INVENTION

The present invention has been made in view of the background prior art discussed above. It is therefore a first object of the present invention to provide a drill which is capable of machining or enlarging a hole previously formed in a workpiece, with high positional accuracy of the enlarged hole. This first object may be achieved according to any one of first through ninth aspects of the invention which are described below. It is a second object of the invention to provide a process of enlarging, by using the drill, the hole which is previously formed in the workpiece in a die-casting processing. This second object may be achieved according to a tenth aspect of the invention which is described below.

The first aspect of this invention provides a drill which comprises a cylindrical main body and a shank contiguous to each other, and which is to be rotated about an axis of the cylindrical main body in a predetermined rotating direction, for machining a hole in a workpiece. The cylindrical main body has flutes which are formed in the cylindrical main body and extend from an axially distal end portion of the cylindrical main body toward the shank, so as to provide cutting edges in the axially distal end portion of the cylindrical main body. The cutting edges cooperate with each other to define a point angle which is not smaller than 170° and is smaller than 180°. Each of the cutting edges is substantially straight as seen in a direction perpendicular to the axis, or is curved such that each of the cutting edges is convexed as seen in the direction perpendicular to the axis.

According to the second aspect of the invention, in the drill defined in the first aspect of the invention, the flutes formed in the cylindrical main body extends in a helical direction of the cylindrical main body.

According to the third aspect of the invention, in the drill defined in the first or second aspect of the invention, the cylindrical main body is formed of cemented carbide.

According to the fourth aspect of the invention, in the drill defined in any one of the first through third aspects of the invention, the cylindrical main body further has lands each of which is provided by a peripheral portion of the cylindrical main body and is located between the flutes in a circumferential direction of the cylindrical main body. Each of the lands has (i) a first margin provided by a front-side one of widthwise opposite end portions thereof as viewed in the predetermined rotating direction, (ii) a second margin provided by a rear-side one of the widthwise opposite end portions as viewed in the predetermined rotating direction, and (iii) a clearance portion located between the first and second margins in the circumferential direction. A radial distance from the axis to a radially outer end of the clearance portion is smaller than a radial distance, from the axis to a radially outer end of each of the first and second margins.

According to the fifth aspect of the invention, in the drill defined in any one of the first through fourth aspects of the invention, the cylindrical main body further has at least one oil hole which is formed therethrough and which opens in the axially distal end portion thereof.

According to the sixth aspect of the invention, in the drill defined in the fifth aspect of the invention, the above-described at least one oil hole is formed to extend in a helical direction of the cylindrical main body.

According to the seventh aspect of the invention, in the drill defined in the sixth aspect of the invention, the above-described at least one hole consists of two oil holes.

According to the eighth aspect of the invention, in the drill defined in any one of the first through seventh aspects of the invention, the point angle is about 175°.

According to the ninth aspect of the invention, in the drill defined in any one of the first through eighth aspects of the invention, the cylindrical main body further has (a) lands each of which is provided by a peripheral portion of the cylindrical main body and is located between the flutes in a circumferential direction of the cylindrical main body, and (b) a web which is provided by a central portion of the cylindrical main body and joints the lands and which has a predetermined thickness as measured in the axially distal end portion of the cylindrical main body. A ratio of the predetermined thickness of the web to a diameter of the drill is 0.20-0.30.

The tenth aspect of this invention provides a process of enlarging, by using the drill defined in any one of the first through ninth aspects of the invention, the hole which is previously formed in the workpiece in a die-casting processing. The process comprises feeding at least one of the drill and the workpiece relative to the other in an axial direction of the cylindrical main body of the drill, while rotating at least one of the drill and the workpiece relative to the other, thereby enlarging the hole.

The drill according to the present invention in which the point angle is larger than about 170° and is smaller than about 180°, is capable of machining or enlarging a hole previously formed in a workpiece, with a smaller radial component of a cutting resistance or force acting on the drill, than a conventional drill in which the point angle is not smaller than 120° and is not larger than 140°. Therefore, even if the axis of the cylindrical main body of the drill is not aligned with an axis of the previously formed hole while the hole is being enlarged by the drill, it is possible to minimize run out or deflection of the drill, namely, restrain the axially distal end portion of the cylindrical main body of the drill from becoming eccentric with respect to an axis of a spindle of a machine tool used for the drilling operation, thereby restraining deviation of the point of the drill from a target position, resulting in high positional accuracy of the enlarged hole. Further, the reduction in the radial component of the cutting resistance leads also to a reduction in chattering of the drill, thereby making it possible to prolong the tool life of the drill.

Further, in the drill according to the invention, each of the cutting edges is substantially straight as seen in the direction perpendicular to the axis, or is curved such that each of the cutting edges is convexed as seen in the direction perpendicular to the axis. Either one of these arrangements is effective to cause the radial component of the cutting force to act on the drill inwardly in the radial direction rather than outwardly in the radial direction, thereby avoiding outward displacement of the point of the drill from in the radial direction and accordingly preventing deterioration in the positional accuracy of the enlarged hole. This is contrast to an arrangement in which each cutting edge is curved to be concaved as seen in the direction perpendicular to the axis. This concaved arrangement causes the radial component of the cutting force to act on the drill in a direction away from the axis, i.e., in the radially outward direction, whereby the point of the drill tends to be displaced outwardly in the radial direction.

While each cutting edge may be either straight or curved to be convexed, the convexed cutting edge arrangement is advantageous over the straight cutting edge arrangement, in positional accuracy of the machined hole and in cutting efficiency. That is, in the convexed cutting edge arrangement, the radial component of the cutting force can be made still smaller than in the straight cutting edge arrangement, so that the run out of the drill can be made still smaller than in the straight cutting edge arrangement, whereby the positional accuracy of the machined hole can be further improved. Further, in the convexed cutting edge arrangement, each cutting edge can be brought into contact with a larger surface area of the workpiece than in the straight cutting edge arrangement, whereby the cutting efficiency is further increased.

The drill defined in the third aspect of the invention achieves excellent cutting capacity and enhanced wear resistance, owing to the formation of its cylindrical main body with the cemented carbide. The excellent cutting capacity and enhanced wear resistance lead to further improvements in the cutting efficiency and accuracy, and also to further prolongation of its tool life. It is therefore preferable that the cylindrical main body of the drill is formed of the cemented carbide. However, it may be formed of other material such as high speed steel.

In the drill defined in the fourth aspect of the invention, each of the lands has, in addition to the first margin provided by its front-side end portion, the second margin provided by its rear-side end portion. In a drilling operation with this drill, the hole is drilled by the cutting edges, and at the same time the drilled hole is ground or burnished by the first and second margins. It should be noted that the provision of the two margins in each land provides a higher degree of smoothness of the machined hole than where only a single margin provided in each land. Since the hole machined by this drill is thus given the high degree of surface smoothness, the drilled hole does not need to be finished by a reamer or any other finishing tool which is to be used exclusively for finishing an inner circumferential surface of the machined hole. The elimination of necessity of a finishing step by the finishing tool leads to reduction in number of steps in a process of manufacturing a product, and the consequent reduction in a cost required for manufacturing the product.

The drill constructed according to the invention can be advantageously used for the process, as defined in the above-described tenth aspect of the invention, of enlarging the hole which is previously formed in the workpiece in a die-casting processing. Owing to the above-described technical advantages provided by the drill, the drill does not have to be accurately positioned relative to the workpiece in such a position that permits the axis of the cylindrical main body of the drill to be precisely aligned with the axis of the previously formed hole, prior to the feed of at least one of the drill and the workpiece toward the other in the axial direction. That is, even without the precise alignment of the axes which generally requires a cumbersome operation, the hole can be enlarged with a high positional accuracy thereof. Thus, the drill according to the present invention is useful in enlarging a hole preformed in a workpiece, particularly, in a die-casting process. However, it is advantageous over conventional drills, not only where the hole that is to be enlarged is preformed in a die-casting process but also where it is machined or otherwise formed, as long as there is a possibility that the preformed hole is intended to be enlarged by the drill without aligning the axis of the drill with an axis of the preformed hole.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which:

FIG. 1A is a side view of a drill constructed according to a first embodiment of the invention;

FIG. 1B is a view showing in enlargement a portion of the drill of FIG. 1A which portion is surrounded by a circle "X";

FIG. 4A is a table indicating a result of a test which was conducted to confirm a machining accuracy provided by the drill of the invention;

FIG. 4B is a table indicating a result of a test which was conducted to confirm a durability of the drill of the invention.

DETAILED DESCRIPTION OF THE PREFERRED EMBODIMENT

Figure 2:
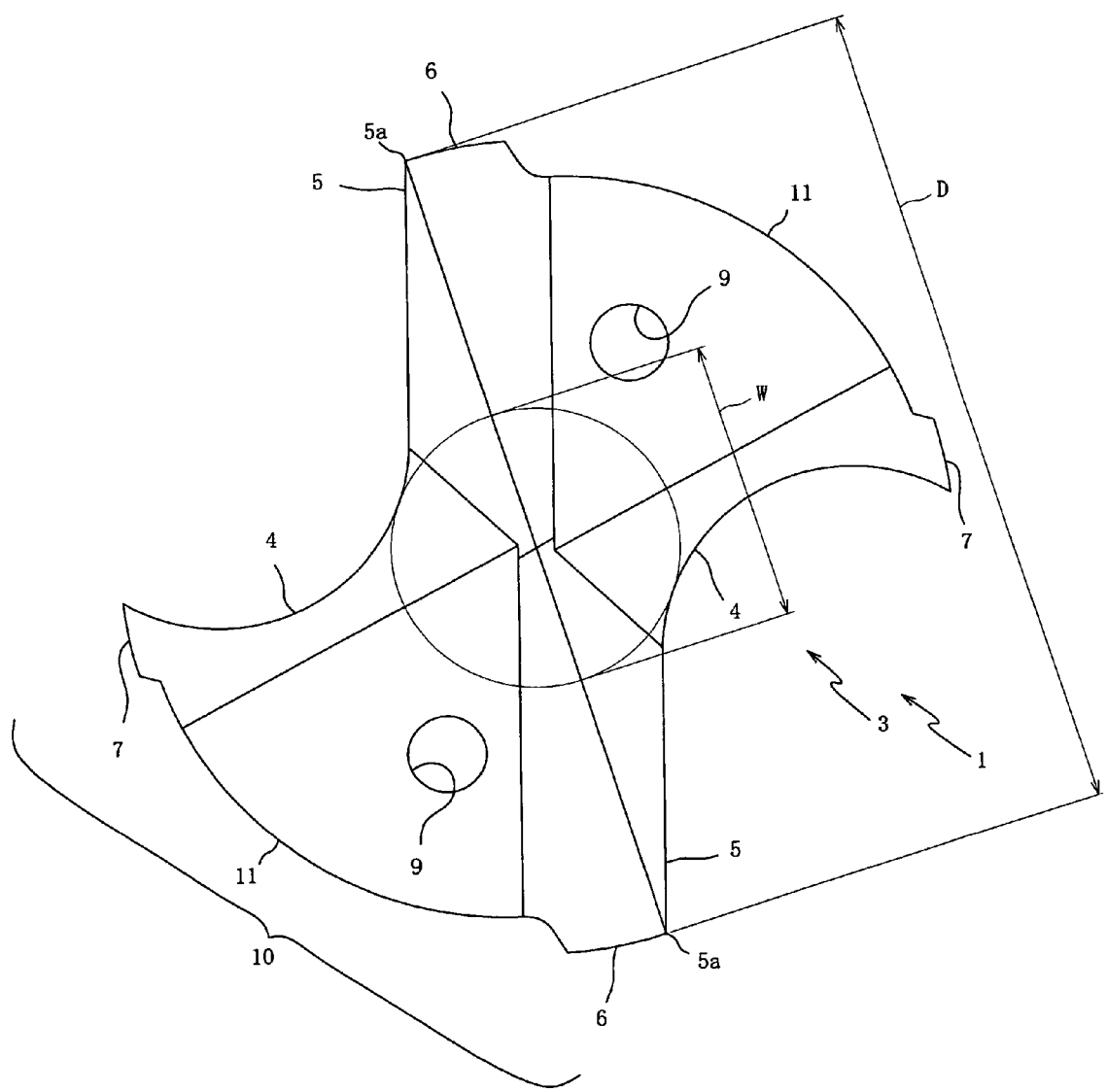
FIG. 2 is a front view of an axially distal end portion of the drill of FIG. 1A.

Referring first to FIGS. 1 and 2, there will be described a drill 1 which is constructed according to a first embodiment of the invention This drill 1 has a cylindrical shank 2 and a cylindrical main body 3 which are coaxial with each other and which are formed integrally with each other. The drill 1 can be attached at its shank 2 to a spindle of a machine tool such as a drilling or milling machine, so as to be rotated about its axis in a predetermined rotating direction, for machining or drilling a hole in a workpiece which is fixedly disposed on a table of the machine tool.

The cylindrical main body 3 of the drill 1, which is formed of cemented carbide, has a pair of helical flutes 4 formed in its outer circumferential surface and extending from its axially distal end portion toward the shank 2, so as to provide a pair of cutting edges 5 in the axially distal end portion. The main body 3 further has a pair of lands 10 each provided by its peripheral portion and located between the flutes 4 in its circumferential direction, and a web provided by its central portion and joining the lands 10. Each of the lands 10 has a first margin 6, a second margin 7 and a clearance portion 11, as shown in FIG. 2. The first margin 6 is provided by a front-side one of widthwise opposite end portions of the land 10 as viewed in the predetermined rotating direction, so as to be adjacent to a leading edge 5a which is provided by a rear-side one of widthwise opposite edges of a corresponding one of the flutes 4 as viewed in the predetermined rotating direction, namely, so as to serve as a flank face of the leading edge 5a. The second margin 7 is provided by a rear-side one of the widthwise opposite end portions of the land 10 as viewed in the predetermined rotating direction. As shown in FIG. 2, the first margin 6 has a thickness larger than that of the second margin 7 in the rotating direction, thereby increasing the durability of the first margin 6 and the leading edge 5a. The clearance portion 11 is located between the first and second margins 6, 7 in the circumferential direction. A radial distance from the axis to a radially outer end of the clearance portion 11 is smaller than a radial distance from the axis to a radially outer end of each of the first and second margins 6, 7.

The drill 1 is equipped with a pair of oil tubes or holes 8 formed through the shank 2 and the main body 3 so as to deliver a cutting fluid which is supplied through the spindle of the machine tool, toward the axially distal end portion of the main body 3. Each of the oil holes 8 is formed to extend in a helical direction of the cylindrical main body 3, and has an opening 9 in a corresponding one of end flank faces which are adjacent to the respective cutting edges 5, so that the cutting fluid ejected through the opening 9 can be applied to a cutting point in a drilling operation. As shown in FIG. 2, the opening 9 has a circular shape which promotes an efficient drilling operation because of smooth contact with the workpiece. Further, the opening 9 is located closer to the first margin 6 than to the second margin 7, i.e, it is offset from the center of the land 10. Since the opening 9 is located closer to the first margin 6, it can promote efficient cooling of the leading edge 5a.

The pair of cutting edges 5 intersect with each other to cooperate with each other to define a point angle θ1 (see FIG. 1B). It is preferable that the point angle θ1 is not smaller than about 170° and is smaller than about 180°. If the point angle θ1 is smaller than 170°, during an operation to drill a hole in a workpiece, a radial component of a cutting resistance or force exerted by the workpiece is so large that the main body 3 of the drill 1 is likely to suffer from run out, particularly, in a case where the hole is previously formed prior to the drilling operation and the previously formed hole is then enlarged by the drill 1 in the drilling operation without the axis of the main body 3 of the drill 1 being aligned with an axis of the previously formed hole. If the point angle θ1 is 180°, the cutting force acts on the drill 1 only in the axial direction without in the radial direction, and the drill 1 has a difficulty in biting onto the workpiece. Further, if the point angle θ1 is larger than 180°, the radial component of the cutting force acts on the main body 3 of the drill 1 outwardly in the radial direction rather than inwardly in the radial direction, whereby the axially distal end portion of the main body 3 is easily displaced outwardly in the radial direction. It is noted that the cutting edges 5 are formed such that the point angle θ1 is 175° in the present embodiment.

In the drilling operation, at least one of the drill 1 and the workpiece is moved toward to the other in the axial direction, while at least one of the drill 1 and the workpiece is rotated relative to the other in the predetermined rotating direction (i.e., in counter clock-wise direction as seen in FIG. 2), so that the workpiece is cut by the cutting edges 5, whereby the hole is drilled. In this instance, an inner circumferential surface of the drilled hole is burnished by the first margins 6, and is then burnished by also the second margins 7 each of which is located on the rear side of the corresponding first margin 6. That is, in the drilling operation with this drill 1, the hole is drilled by the cutting edges 5, and at the same time the drilled hole is burnished at its inner circumferential surface by the first and second margins 6, 7, whereby the inner circumferential surface of the drilled hole is given a high degree of surface smoothness. Therefore, the drilled hole does not need to be finished by a reamer or any other finishing tool which is to be used exclusively for finishing an inner circumferential surface of the drilled hole. The elimination of necessity of a finishing step by the finishing tool leads to reduction in number of steps in a process of manufacturing a product, and the consequent reduction in a cost required for manufacturing the product.

While each of the lands 10 is formed with the two margins 6, 7 in the present embodiment, each land 10 may be formed with only one of the margins 6, 7.

The present drill 10 is designed to be advantageously used to enlarge a hole which is previously formed in a workpiece, for example, in a die-casting processing. Therefore, the web of the drill 1 is adapted to be thicker than those of conventional drills used mainly to originate a hole rather than to enlarge a previously formed hole, whereby the drill 1 has a high degree of torsional stiffness. The web of the drill 1 has a predetermined thickness W as measured in the axially distal end portion of the main body 3, such that the following expression is satisfied:

$$0.2D < W < 0.3D$$

wherein "D" represents a diameter of the drill 1 (i.e., a distance between radially outer ends of the respective cutting edges 5); and "W" represents the thickness of the web.

That is, in the drill 1, a ratio of the web thickness W to the drill diameter D is 0.20-0.30, which is higher than that of the conventional drills. Since the ratio is not lower than 0.20, the drill 1 attains the high degree of torsional stiffness, whereby run out or deflection of the drill 1 can be further reliably restrained. Further, since the ratio is not higher than 0.30, the drill 1 is capable of enlarging the previously formed hole, even where a diameter of the previously formed hole is small, or even where the axis of the main body 3 of the drill 1 is considerably misaligned from an axis of the previously formed hole during the drilling operation.

Figure 3A:
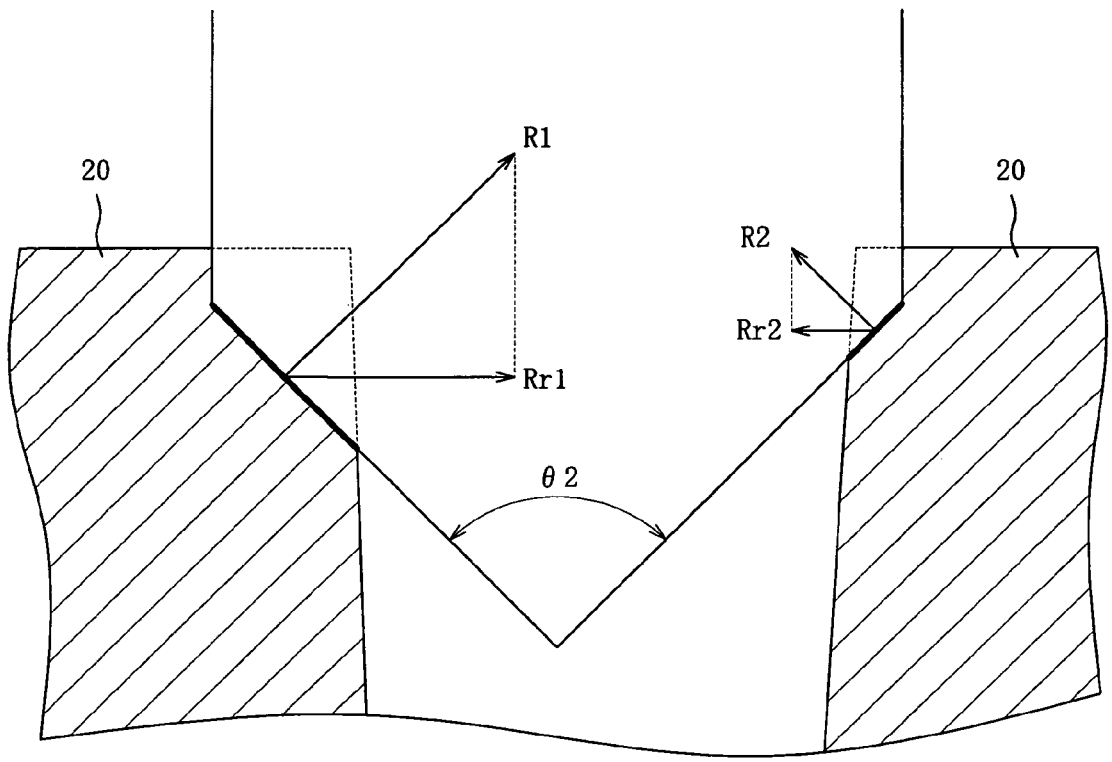
FIG. 3A is a view illustrating a conventional drill during an operation to enlarge a previously formed hole.
Figure 3B:
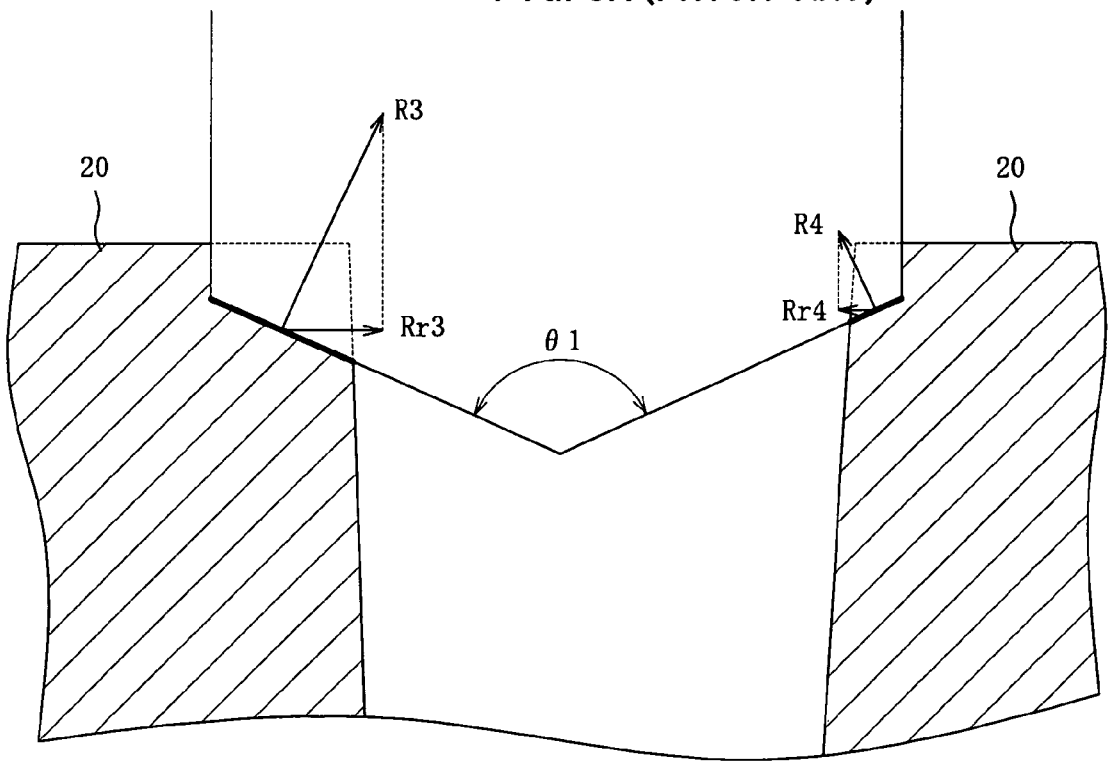
FIG. 3B is a view illustrating the drill of FIG. 1A during an operation to enlarge a previously formed hole.

FIGS. 3A and 3B illustrate a conventional drill and the drill of the invention when used for an operation to enlarge a hole which is previously formed in a workpiece 20. FIGS. 3A and 3B are cross sectional views schematically showing contours of the conventional drill and the drill of the invention as rotated in the operation. It is noted that the point angle θ1 of the drill of the invention and the point angle θ2 of the conventional drill are shown smaller than the actual angles, for easier understanding.

The hole, which is illustrated in each of FIGS. 3A and 3B, is a hole preformed in a die-casting processing, for reducing an amount of stock to be removed by cutting or drilling. That is, the workpiece 20 is previously formed with the hole by a casting mold in the die-casting process. Irrespective of whether the casting mold is provided by a metallic mold or a sand mold, the hole formed in the die-casting process does not have a high degree of positional accuracy, because the metallic mold is thermally expanded while the sand mold is difficult to implement high dimensional accuracy. Therefore, due to such characteristics of the die-casting process, it is common that an axis of the previously formed hole is not aligned with an axis of a hole which is to be eventually formed by enlarging the previously formed hole. It is therefore common that the axis of the drill is not aligned with the axis of the previously formed hole, so that the drill is in contact unevenly at its cutting edges with the workpiece in the drilling operation. Described specifically, one of diametrically opposite portions of the drill is in contact at a relatively large area thereof with the workpiece while the other of the diametrically opposite portions of the drill is in contact at a relatively small area thereof with the workpiece as shown in FIGS. 3A and 32. In this instance, the radial component of the cutting force acting on the above-described one of the diametrically opposite portions (which is referred hereinafter to as a larger-area contact side portion) is larger than that acting on the above-described other of the diametrically opposite portions (which is referred hereinafter to as a smaller-area contact side portion), whereby the drill is forced in a direction away from the larger-area contact side portion toward the smaller-area contact side portion. That is, the axially distal end portion of the drill tends to be deflected in that direction, i.e., in the rightward direction as seen in FIGS. 3A and 3B, thereby deteriorating the positional accuracy of the drilled hole. In view of such a problematic tendency, the inventor of the present invention conducted a study for determining an appropriate value or range of the point angle of the drill, which minimizes run out or deflection of the drill.

In FIG. 3A, a vector R1 represents an amount and a direction of the cutting force exerted by the workpiece 20 on the above-described larger-area contact side portion of the conventional drill; a vector Rr1 represents an amount and a direction of the radial component of the cutting force acting on the larger-area contact side portion of the conventional drill; a vector R2 represents an amount and a direction of the cutting force exerted on the above-described smaller-area contact side portion of the conventional drill; and a vector Rr2 represents an amount and a direction of the radial component of the cutting force acting on the smaller-area contact side portion of the conventional drill. Similarly, in FIG. 3B, a vector R3 represents an amount and a direction of the cutting force exerted by the workpiece 20 on the larger-area contact side portion of the drill of the invention; a vector Rr3 represents an amount and a direction of the radial component of the cutting force acting on the larger-area contact side portion of the drill of the invention; a vector R4 represents an amount and a direction of the cutting force exerted on the smaller-area contact side portion of the drill of the invention; and a vector Rr4 represents an amount and a direction of the radial component of the cutting force acting on the smaller-area contact side portion of the drill of the invention. It is noted that an axial component of the cutting force acting on the drill in the axial direction is not shown in FIGS. 3A and 3B.

Since the point angle θ1 of the drill of the present invention is larger than the point angle θ2 of the conventional drill (θ1>θ2), the cutting force acts on the drill of the invention more vertically or axially than the cutting force acting on the conventional drill. That is, as compared with the direction of the cutting force acting on the conventional drill as represented by the vectors R1, R2, the direction of the cutting force acting on the drill of the invention as represented by the vectors R3, R4 is closer to the axial direction. Consequently, the amounts of the radial components acting on the drill of the invention as represented by the vectors Rr3, Rr4 are made smaller than the amounts of the radial components acting on the conventional drill as represented by the vectors Rr1, Rr2 (that is, Rr3<Rr1, Rr4 <Rr2). Further, a difference between the amounts of the radial components represented by the respective vectors Rr3, Rr4 is made smaller than a difference between the amounts of the radial components represented by the respective vectors Rr1, Rr2 (that is, Rr3-Rr4<Rr1-Rr2).

Thus, as is apparent from FIGS. 3A and 3B, in the drill of the invention having the relatively large point angle θ1 which is set to be not smaller than about 170° and is smaller than about 180°, the amounts of the radial components and the difference between the amounts of the radial components can be made smaller than those in the conventional drill. Therefore, the drill of the invention is prevented from being deflected or becoming eccentric with respect to the axis of the spindle of the machine tool, and is accordingly capable of restraining deterioration of the positional accuracy of the drilled hole.

Referring next to FIGS. 4A and 4B, there will be described two tests which were conducted by the present inventors by using the drill of the invention and a conventional drill.

FIG. 4A is a table indicating a result of a test which was conducted as one of the above-described two tests, for comparing machining accuracies provided by two drills, i.e., the drill of the invention and the conventional drill. In cutting operation of this accuracy test, a previously formed hole was enlarged by each of the two drills with two different cutting speeds under a condition as described below. It is noted that the drill of the invention and the conventional drill had the point angles of 175° and 140°, respectively, and had the same cutter diameter of 9.24 mm and the same helix angle of 33°. It is also noted that the axis of each of the two drill was intentionally held offset from the axis of the previously formed hole (by a radial distance of 1 mm) while the hole being enlarged by each drill, for the purpose of approximating the condition of the test to an actual condition of operation to enlarge a hole preformed in a die-casting process.

[Condition]
Diameter of drill: φ9.24 mm
Work material: ADC12
Diameter of preformed hole: φ6.2 mm
Depth of preformed hole: 25 mm (blind hole)
Axial distance over which hole is to be enlarged: 25 mm
Cutting fluid: Water soluble cutting fluid In the table of FIG. 4A, the term "DEVIATION AMOUNT" represents an amount of deviation of a position of the axis of the actually enlarged hole from a target potion (on which the axis of the actually enlarged hole should have to lie), as measured in the radial direction. As indicated by the table of FIG. 4A, the preformed hole enlarged by the conventional drill with a relatively low cutting speed (i.e., at number of revolutions of 6,000 mm$^{-1}$ and feed rate of 0.33 mm/rev) had the DEVIATION AMOUNT of 0.234 mm, while that enlarged by the conventional drill with a relatively high cutting speed (i.e., at number of revolutions of 12,000 mm$^{-1}$ and feed rate of 1.3 mm/rev) had the DEVIATION AMOUNT of 0.504 mm. That is, the positional accuracy of the enlarged hole was deteriorated with the increase in the cutting speed when the preformed hole was enlarged by the conventional drill. It is noted that a large noise was generated and chattering was caused during the cutting operation done by the conventional drill with the low cutting speed as well as with the high cutting speed.

On the other hand, the preformed hole enlarged by the drill of the invention with the relatively low cutting speed (i.e., at number of revolutions of 6,000 mm$^{-1}$ and feed rate of 0.33 mm/rev) had the DEVIATION AMOUNT of 0.060 mm, while that enlarged by the conventional drill with the relatively high cutting speed (i.e., at number of revolutions of 12,000 mm$^{-1}$ and feed rate of 1.3 mm/rev) had the DEVIATION AMOUNT of 0.040 mm. That is, the positional accuracy of the enlarged hole was held substantially constant without deterioration due to the increase in the cutting speed when the preformed hole was enlarged by the drill of the invention. Further, the drill of the invention could enlarge the hole with a much higher positional accuracy than the conventional drill. That is, run out or deflection of the tool was more effectively restrained in the cutting operation with the drill of the invention than in the cutting operation with the conventional drill. It is noted that a large noise was not generated and chattering was not caused during the cutting operation done by the drill of the invention with the high cutting speed as well as with the low cutting speed.

FIG. 4B is a table indicating a result of a test which was conducted as another test, for comparing durabilities of the drill of the invention and the conventional drill. In cutting operation of this durability test, previously formed holes were successively enlarged by each of the two drills under the same condition as in the above-described accuracy test. The cutting operation by each of the two drills was continued until a total of 200 holes had been enlarged by the drill, or until the drill became incapable for continuing the cutting operation. The two drills used in the durability test are the same as those used in the accuracy test. The axis of each of the two drills was held offset from the axis of the previously formed hole (by a radial distance of 1 mm) while the hole being enlarged by each drill, like in the accuracy test.

As indicated by the table of FIG. 4B, the conventional drill was broken in its body and became incapable for continuing the cutting operation, when the drill was enlarging a sixteenth (16th) hole. On the other hand, the drill of the invention successively drilled 200 holes, and no damage was found in the drill of the invention even after the 200th holes was enlarged. Further, the DEVIATION AMOUNT in the 1st through 200th holes drilled by the drill of the invention was held in a small range of 0.06-0.07 mm, without its large change or deterioration.

Figure 5:
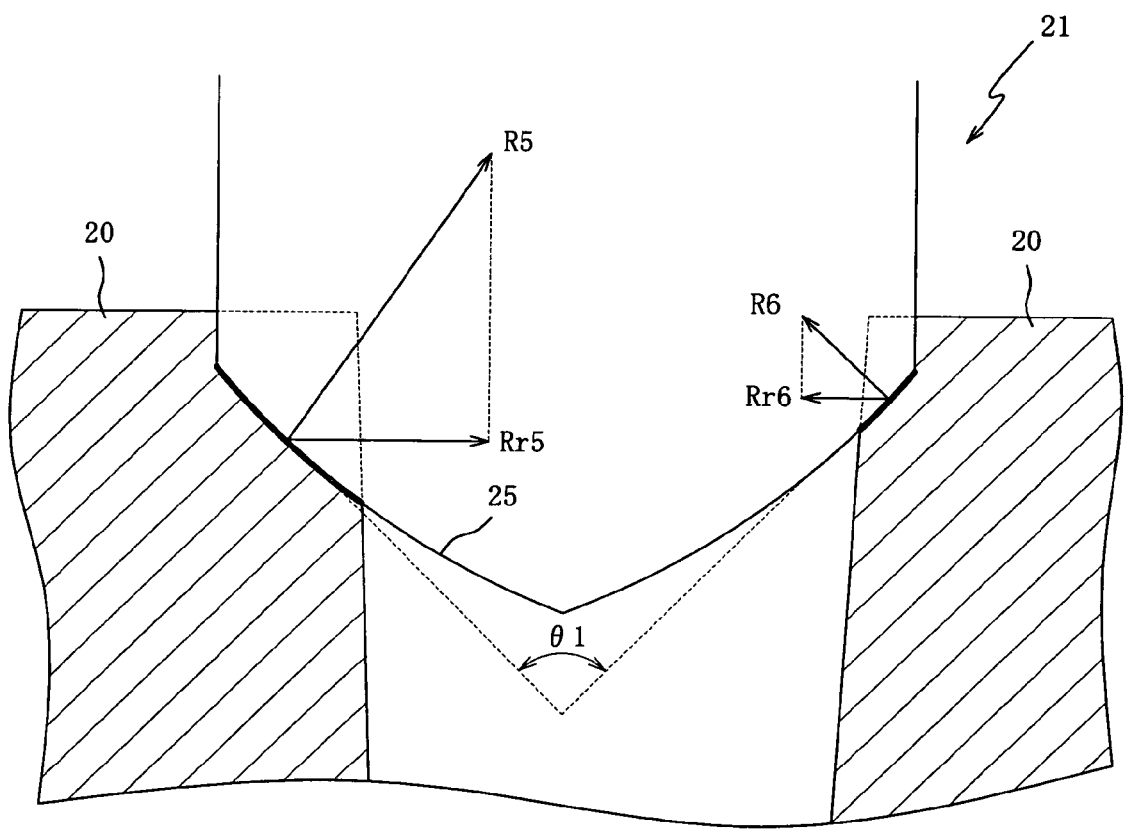
FIG. 5 is a view illustrating a drill constructed according to a second embodiment of the invention, during an operation to enlarge a previously formed hole.

Referring next to FIG. 5, there will be described a drill 21 constructed according to a second embodiment of the invention. This drill 21 is different from the drill 1 of the above-described first embodiment in shape of each of the cutting edges. That is, while each cutting edge 5 is formed to be substantially straight as seen in the direction perpendicular to the axis in the drill 1 of the above-described first embodiment, each cutting edge 25 is formed to be convexed as seen in the direction perpendicular to the axis in the drill 21 of the second embodiment. In the following descriptions, the same reference signs as used in the first embodiment will be used to identify the same or similar elements, and redundant description of these elements will not be provided.

FIG. 5 is a cross sectional view showing a contour of the drill 21 as rotated for enlarging a hole which is preformed in the workpiece 20. As shown in FIG. 5, each of the cutting edges 25 is formed to be convexed in a direction toward an axially distal end of the main body 3 away from the shank 2. The convexed cutting edge 25 is defined by a line which is arcuated or curved as seen in the direction perpendicular to the axis of the cylindrical main body 3, such that the curved line has a radius of curvature that is about twice as large as the diameter D of the drill 21. The point angle θ1, which is 175° as in the drill 1 of the first embodiment, corresponds to an angle defined by mutually intersecting lines (represented by broken lines in FIG. 5) which are adjacent to the respective cutting edges 25 at their respective radially outer ends. It is noted that the point angle θ1 is shown smaller in FIG. 5 than the actual angles, for easier understanding.

Since each cutting edge 25 is formed to be convexed rather than to be straight as seen in the direction perpendicular to the axial direction of in the drill 21, the workpiece 20 is cut, at its surface that is curved rather than straight as seen in the direction perpendicular to the axial direction, by each cutting edge 25. Therefore, the cutting force exerted by the workpiece 20 acts on the drill 21 more vertically or axially than the cutting force acting on the conventional drill. That is, as compared with the direction of the cutting force acting on the conventional drill as represented by the vectors R1, R2 (see FIG. 3A), the direction of the cutting force acting on the drill 21 as represented by vectors R5, R6 is closer to the axial direction. Consequently, the amounts of the radial components acting on the drill 21 as represented by the vectors Rr5, Rr6 are made smaller than the amounts of the radial components acting on the conventional drill as represented by the vectors Rr1, Rr2 (that is, Rr5<Rr1, Rr6<Rr2). Further, a difference between the amounts of the radial components represented by the respective vectors Rr5, Rr6 is made smaller than a difference between the amounts of the radial components represented by the respective vectors Rr1, Rr2 (that is, Rr5-Rr6<Rr1-Rr2). Therefore, like the drill 1 of the first embodiment, the drill 21 of the second embodiment is prevented from being deflected or becoming eccentric with respect to the axis of the spindle of the machine tool, and is accordingly capable of restraining deterioration of the positional accuracy of the drilled hole.

Further, in the drill 21 of the second embodiment, each cutting edge 25 can be brought into contact with a larger surface area of the workpiece 20 than in the drill 1 of the first embodiment in which each cutting edge 5 is provided by the straight cutting edge, thereby leading to an increase in amount of stock removal by each one revolution of the drill 21 and the consequent increase in its cutting efficiency.

While the preferred embodiments of the present invention have been described above in detail for illustrative purpose only, it is to be understood that the invention is not limited to the above-described embodiments but may be otherwise embodied.

For example, in the above-described embodiments, the flutes 4 formed in the outer circumferential surface of the cylindrical main body 3 are arranged to extend in the helical direction. However, each of the flutes 4 does not have to be necessarily provided by the helical flute, but may be provided by a straight flute arranged to extend substantially in parallel with the axial direction.

It is to be understood that the present invention may be embodied with various other changes, modifications and improvements, which may occur to those skilled in the art, without departing from the sprit and scope of the invention defined in the following claims.

What is claimed is:

1. A drill for machining a hole in a workpiece, comprising:
a cylindrical main body,
a shank contiguous to said cylindrical main body where the shank is rotated about an axis of said cylindrical main body in a predetermined rotating direction, and
an oil hole formed through said cylindrical main body and shank for delivering cutting fluid to an axial distal end portion of said cylindrical main body,
wherein said drill is used to enlarge a hole previously formed in a workpiece through a die-casting process of the workpiece,
wherein said cylindrical main body has flutes which are formed in said cylindrical main body and are extended from an axially distal end portion of said cylindrical main body toward said shank, so as to provide cutting edges in said axially distal end portion of said cylindrical main body,
wherein said cylindrical main body has lands at peripheral portions thereof located between said flutes in a circumferential direction wherein each of said lands has a first margin provided at a front-side thereof as viewed in the rotating direction and a second margin provided at a rear-side thereof as viewed in the rotating direction, where said first margin has a thickness larger than that of said second margin in the rotating direction,
wherein an end opening of said oil hole has a circular shape and is located closer to said first margin than to said second margin,
wherein said cutting edges cooperate with each other to define a point angle which is larger than 170° and is smaller than 180°,
and wherein each of said cutting edges is substantially straight as seen in a direction perpendicular to said axis.

2. The drill according to claim 1, wherein said flutes formed in said cylindrical main body extend in a helical direction of said cylindrical main body.

3. The drill according to claim 1, wherein said cylindrical main body is formed of cemented carbide.

4. The drill according to claim 1, wherein each of said lands further includes a clearance portion located between said first and second margins in the circumferential direction,
and wherein a radial distance from said axis to a radially outer end of said clearance portion is smaller than a radial distance from said axis to a radially outer end of each of said first and second margins.

5. The drill according to claim 1, wherein said oil hole is formed to extend in a helical direction of said cylindrical main body.

6. The drill according to claim 5, wherein said oil hole consists of two oil holes.

7. The drill according to claim 1, wherein said point angle is about 175°.

8. The drill according to claim 1,
wherein said cylindrical main body further has a web which is provided by a central portion of said cylindrical main body and joints said lands and which has a predetermined thickness as measured in said axially distal end portion of said cylindrical main body,
and wherein a ratio of said predetermined thickness of said web to a diameter of said drill is 0.20-0.30.

9. A drill for machining a hole in a workpiece, comprising:
a cylindrical main body,
a shank contiguous to said cylindrical main body where the shank is rotated about an axis of said cylindrical main body in a predetermined rotating direction, and
an oil hole formed through said cylindrical main body and shank for delivering cutting fluid to an axial distal end portion of said cylindrical main body,
wherein said drill is used to enlarge a hole previously formed in a workpiece through a die-casting process of the workpiece,
wherein said cylindrical main body has flutes which are formed in said cylindrical main body and are extended from an axially distal end portion of said cylindrical main body toward said shank, so as to provide cutting edges in said axially distal end portion of said cylindrical main body,
wherein said cylindrical main body has lands at peripheral portions thereof located between said flutes in a circumferential direction wherein each of said lands has a first margin provided at a front-side thereof as viewed in the rotating direction and a second margin provided at a rear-side thereof as viewed in the rotating direction, where said first margin has a thickness larger than that of said second margin in the rotating direction,
wherein an end opening of said oil hole has a circular shape and is located closer to said first margin than to said second margin,
wherein said cutting edges cooperate with each other to define a point angle which is larger than 170° and is smaller than 180°,
and wherein each of said cutting edges is curved such that said each of said cutting edges is convexed in a direction toward said axially distal end portion as seen in a direction perpendicular to said axis.

10. The drill according to claim 9, wherein said flutes formed in said cylindrical main body extend in a helical direction of said cylindrical main body.

11. The drill according to claim 9, wherein said cylindrical main body is formed of cemented carbide.

12. The drill according to claim 9, wherein each of said lands further includes a clearance portion located between said first and second margins in the circumferential direction,
and wherein a radial distance from said axis to a radially outer end of said clearance portion is smaller than a radial distance from said axis to a radially outer end of each of said first and second margins.

13. The drill according to claim 9, wherein said oil hole is formed to extend in a helical direction of said cylindrical main body.

14. The drill according to claim 13, wherein said oil hole consists of two oil holes.

15. The drill according to claim 9, wherein said point angle is about 175°, and wherein a radius of curvature of said cutting edge is about twice as large as the diameter of the drill.

16. The drill according to claim 9,
wherein said cylindrical main body further has a web which is provided by a central portion of said cylindrical main body and joints said lands and which has a predetermined thickness as measured in said axially distal end portion of said cylindrical main body,
and wherein a ratio of said predetermined thickness of said web to a diameter of said drill is 0.20-0.30.

17. A process of enlarging, by using the drill defined in claim 1, the hole which is previously formed in the workpiece in said die-casting processing, said process comprising:
feeding at least one of said drill and said workpiece relative to the other in an axial direction of said cylindrical main body of said drill, while rotating at least one of said drill and said workpiece relative to the other, so as to enlarge the hole.

18. A process of enlarging, by using the drill defined in claim 9, the hole which is previously formed in the workpiece in said die-casting processing, said process comprising:

feeding at least one of said drill and said workpiece relative to the other in an axial direction of said cylindrical main body of said drill, while rotating at least one of said drill and said workpiece relative to the other, so as to enlarge the hole.

* * * * *